Figure 1:
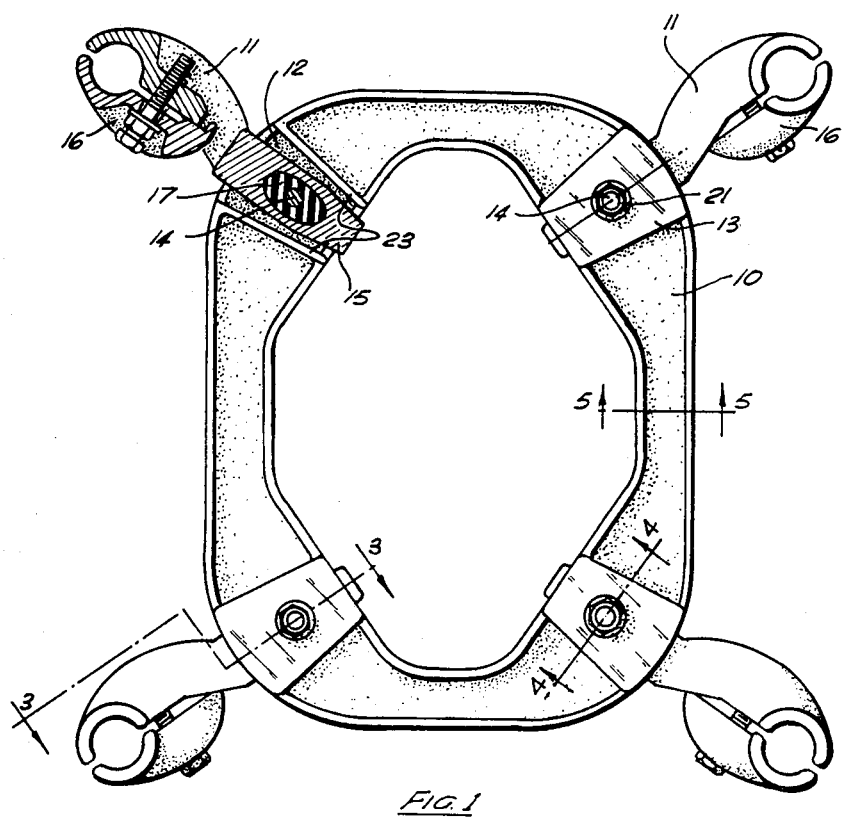

United States Patent [19]

Hearnshaw

[11] 4,242,537
[45] Dec. 30, 1980

[54] SPACER DAMPER

[75] Inventor: David Hearnshaw, Lutterworth, England

[73] Assignee: Dulmison (Australia) Pty. Ltd., Australia

[21] Appl. No.: 43,567

[22] Filed: May 29, 1979

[30] Foreign Application Priority Data

Jun. 8, 1978 [AU] Australia .............................. PD4641

[51] Int. Cl.³ .......................... H02G 7/14; H02G 7/12
[52] U.S. Cl. ........................................ 174/42; 174/146
[58] Field of Search .................................. 174/42, 146

[56] References Cited

U.S. PATENT DOCUMENTS

| 3,784,723 | 1/1974 | Cantamessa | 174/146 X |
| 3,885,086 | 5/1975 | Houston et al. | 174/146 X |
| 3,979,553 | 9/1976 | Smart | 174/146 X |

FOREIGN PATENT DOCUMENTS 584633 10/1959 Canada ...................................... 174/146

*Primary Examiner*—Laramie E. Askin
*Attorney, Agent, or Firm*—Beveridge, DeGrandi, Kline & Lunsford

[57] ABSTRACT

A spacer damper for transmission line cables is disclosed comprising a substantially planar frame and a plurality of clamping arms each resiliently pivotally connected at its proximal end to the frame and provided at its distal end with clamping means for respectively grasping individual conductors. The frame is of rigid one-piece construction and provided at each region of pivotal connection with a recessed portion into which at least the proximal end of the arm extends so as to lie substantially in the plane of the frame. A locking bolt fixed with respect to the frame and extending through the recessed portion and through the proximal end of the arm is provided to define an axis of hinged part rotation for the arm. Each arm is resiliently pivotally connected to the frame by a pair of spaced resilient energy absorbing elements located on either side of the arm to be traversed by the bolt and lockingly engaged with recesses formed in the arm. Each recessed portion of the frame is provided with at least one end cap, itself provided with a recess for lockingly engaging one of the elements, the end cap being rigidly secured to the frame by the locking bolt so as to straddle the recessed portion, hold the elements in compression and thereby secure the arm for resilient hinged part rotation relative to the frame.

9 Claims, 10 Drawing Figures

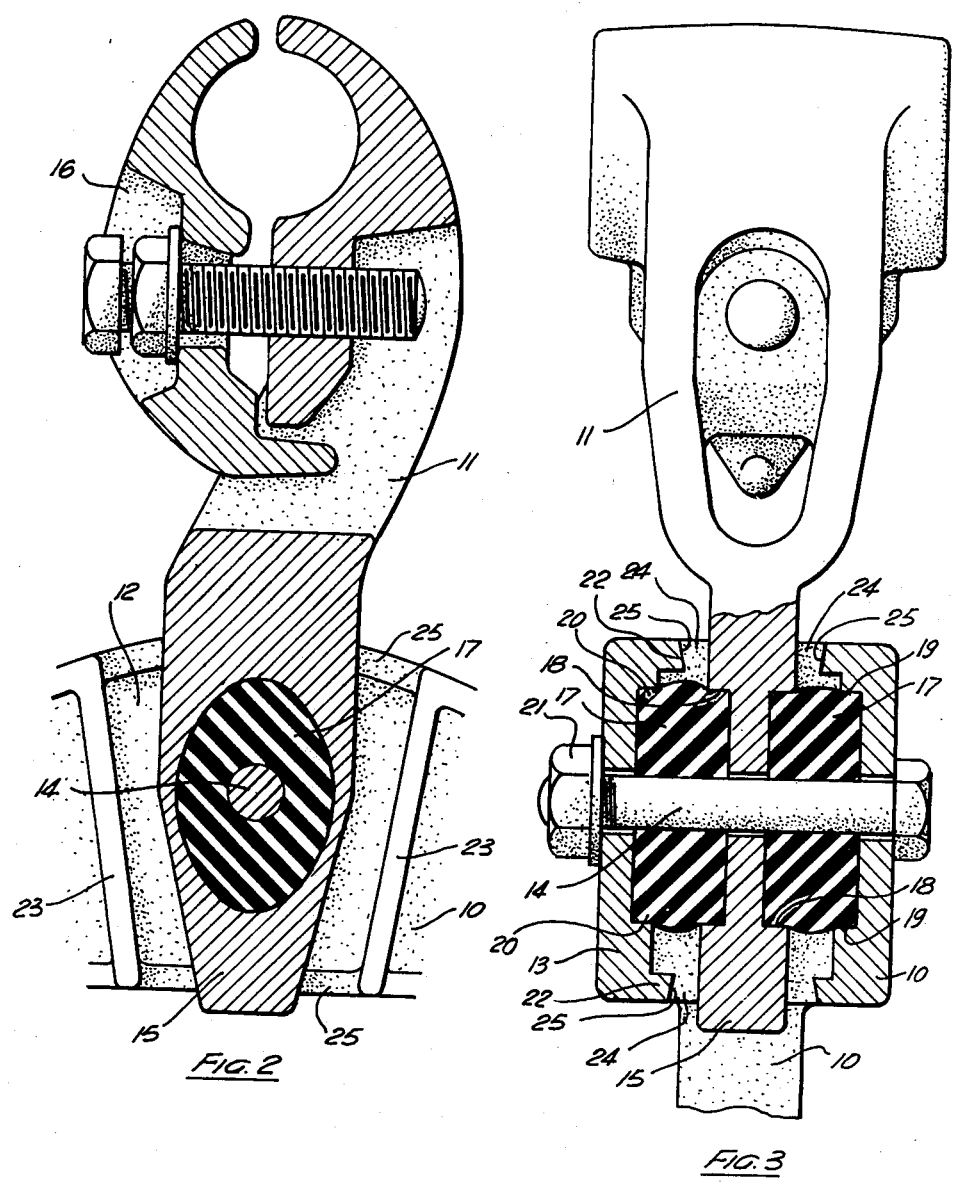

SPACER DAMPER

The present invention relates to spacer dampers for damping oscillations in electric power transmission lines whilst maintaining individual conductors in their predetermined spaced configuration.

Such dampers generally comprise a frame from which extend a plurality of resiliently mounted arms adapted for connection to the conductor lines. Oscillation of the individual conductors causes the arms to move relative to the frame against the resilient restraint of their respective joints, thereby to damp the oscillations while the conductors are maintained in the required spaced relationship These dampers experience problems arising from exposure to the elements, fatigue and electrical phenomena. Furthermore, dampers having frames constructed in two complementary cast halves are relatively heavy and complex in construction, as well as being particularly prone to exposure problems.

It is an object of the present invention to provide a spacer damper which is relatively simple to construct and which will provide adequate endurance and service.

According to the invention there is provided a spacer damper for transmission line cables comprising a substantially planar frame and a plurality of clamping arms each resiliently pivotally connected at its proximal end to said frame and provided at its distal end with clamping means for respectively grasping individual conductors;

said frame being of rigid one-piece construction and provided at each region of pivotal connection with a recessed portion into which at least the proximal end of said arm extends so as to lie substantially in the plane of said frame;

a locking bolt fixed with respect to said frame and extending through said recessed portion and through the proximal end of said arm thereby to define an axis of hinged part rotation for said arm;

each said arm being resiliently pivotally connected to said frame by a pair of spaced resilient energy absorbing elements located on either side of said arm to be traversed by said bolt and lockingly engaged with recesses formed in said arm;

each said recessed portion of said frame being provided with at least one end cap provided with a recess for lockingly engaging one of said elements, said end cap being rigidly secured to said frame by said locking bolt so as to straddle said portion, hold said elements in compression and thereby secure said arm for resilient hinged part rotation relative to said frame.

Figure 4:
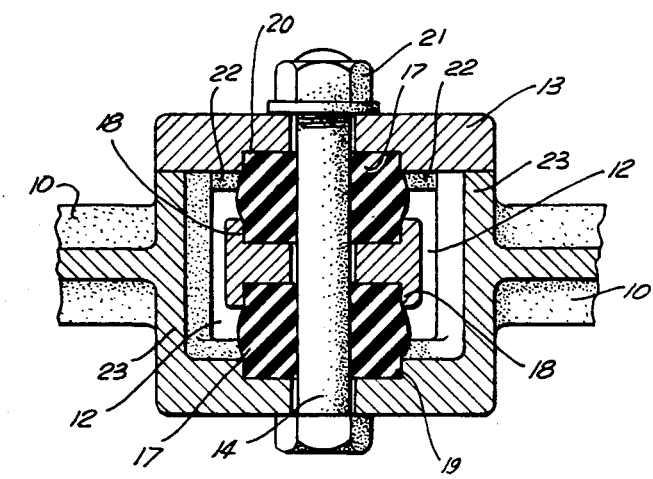
Figure 5:
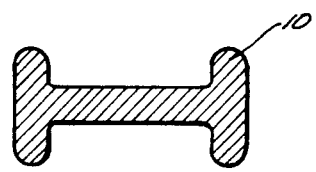
Figure 6:
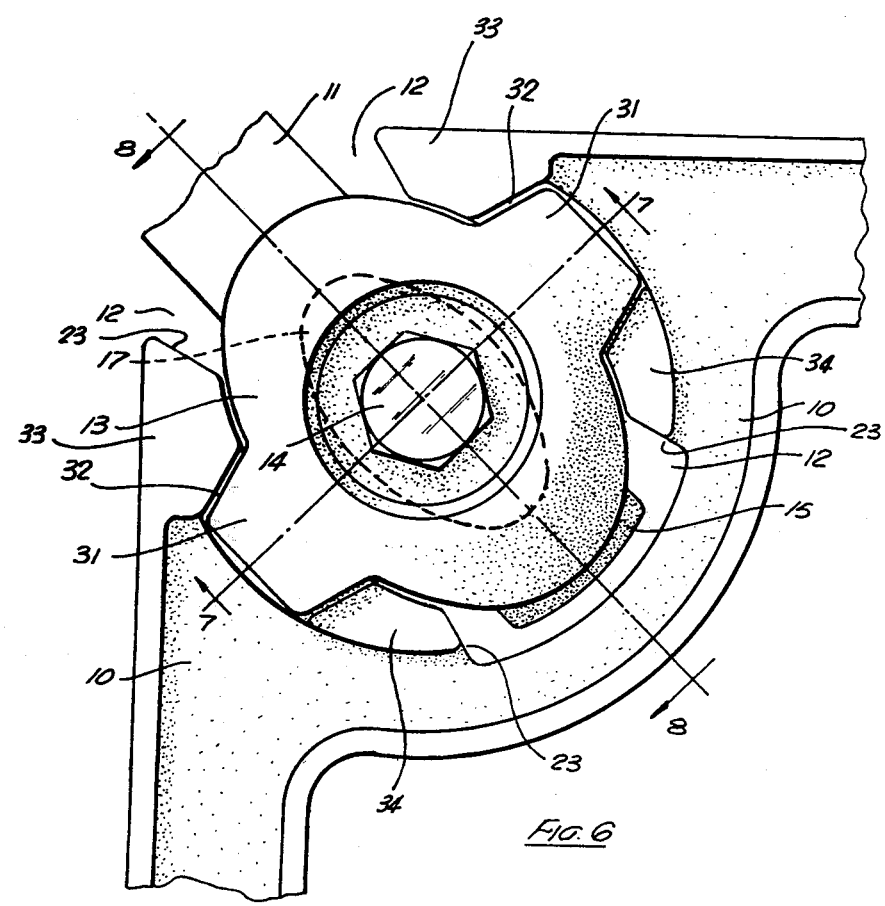
Figure 8:
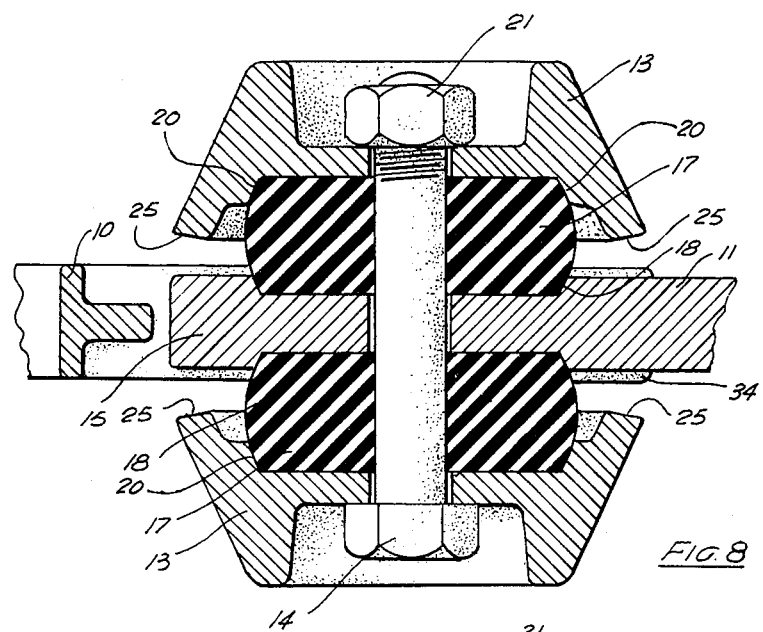
Figure 7:
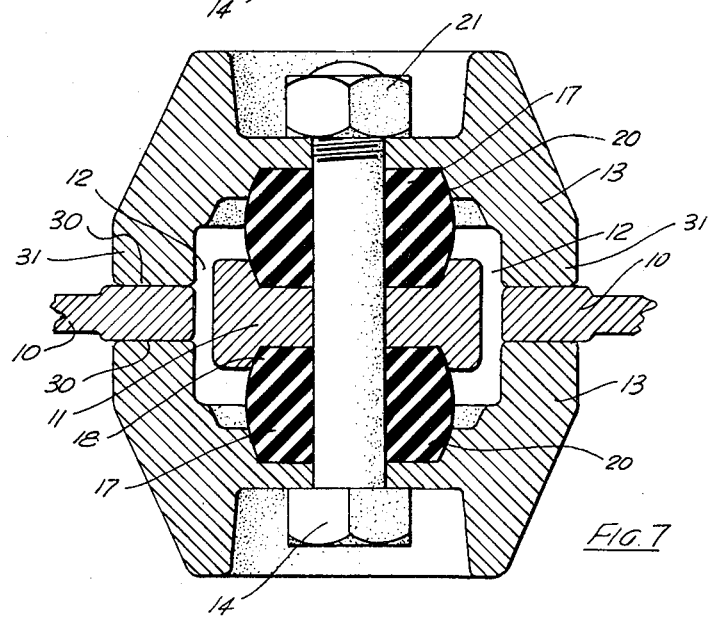
Figure 9:
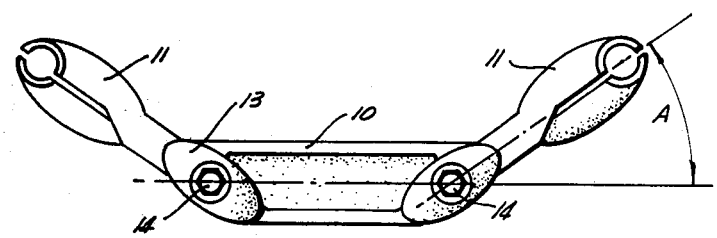
Figure 10:
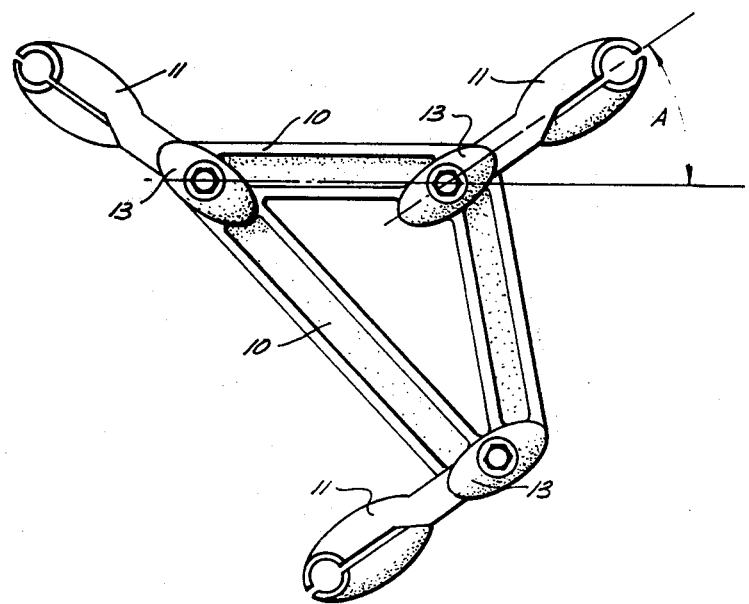

Preferred embodiments of the invention will now be described, by way of example only, with reference to the accompanying drawings in which:

FIG. 1 is a partly sectioned side elevation of a four-arm spacer damper according to a first embodiment of the invention, with one of the end caps removed FIG. 2 is an enlarged view of part of the spacer damper of FIG. 1 showing one of the clamping arms and the region of pivotal connection with the frame in greater detail;

FIG. 3 is a view taken on line 3—3 of FIG. 1;
FIG. 4 is a view taken on line 4—4 of FIG. 1;
FIG. 5 is a view taken on line 5—5 of FIG. 1;
FIG. 6 is an enlarged side elevation of part of a spacer damper according to a second embodiment of the invention;
FIG. 7 is a view taken on line 7—7 of FIG. 6;
FIG. 8 is a view taken on line 8—8 of FIG. 6;
FIG. 9 is a somewhat diagrammatic side elevation of a two arm spacer damper according to a third embodiment of the invention; and
FIG. 10 is a somewhat diagrammatic side elevation of a three arm spacer damper according to a fourth embodiment of the invention.

Referring initially to FIGS. 1 to 5 of the drawings, the spacer damper includes a substantially planar frame 10 formed from a one-piece casting of an aluminum alloy. The frame has the general form of a ring with an I-shaped cross-section as shown in FIG. 5. In the illustrated embodiment, four identical clamping arms 11 are resiliently pivotally connected to the frame at spaced locations therearound defined by recessed portions 12, each of which is provided with an end cap 13 and a locking bolt 14. The locking bolt 14 extends through the frame 10, the recessed portion 12, an aperture formed in the proximal end 15 of the clamping arm 11 and finally the end cap 13 which spans the recessed portion 12. The bolt thereby defines an axis of hinged part rotation for the arm.

Each of the arms has a conductor clamp 16 located at its distal end and is resiliently pivotally connected to the frame by a pair of spaced resilient energy absorbing elements 17 located on either side of the proximal end of the arm. The elements 17 are preferably of elliptical cross-section as shown and lockingly engage with correspondingly shaped recesses 18, 19 and 20 formed in the arm, frame and end cap respectively. When the end cap 13 is rigidly secured to the frame by the locking bolt 14 and nut 21 as best shown in FIG. 4, the resilient elements 17 are held in compression thereby to secure the arm for resilient hinged part rotation relative to the frame. Projecting ridges 22 on the end cap key it into the recessed portion 12 so as to lock the end cap securely against rotation relative to the frame.

It will be observed that the recesses 12 permit the clamping arms to be secured such that they lie substantially in the plane of the frame and thereby substantially eliminate eccentric loadings. Furthermore, the opposing walls 23 of the recess 12 define abutment faces for limiting the maximum allowable amplitude of resilient part rotation thereby to prevent damage to the resilient elements which are preferably formed of an elastomeric semi-conducting material to provide a conductive path between the arm and the frame. Alternatively, the elements may be constructed of insulated material and a conductive path provided between the arm and the frame by a suitable bridging conductor, for example, a spring or length of metallic braid such as aluminum.

The axial dimensions of the components are selected such that the resilient elements receive a predetermined amount of compression when the end cap is clamped into engagement with the frame. The degree of compression is selected for optimum environmental resistance and endurance properties. When subjected to forces causing movement of the arm relative to the frame, torsional shearing of the resilient elements provides a required flexibility and damping characteristics for the joint.

The joint is also able to accommodate a predetermined range of differential longitudinal conductor motion by virtue of the spacing 24 between the arm and adjacent inclined abutment faces 25 formed on the frame and end cap ridges 22. These opposed faces limit the maximum permissible twist or axial displacement of the arm relative to the frame so as to ensure that excessive loads do not cause complete loss of compression of the resilient elements, while still allowing a predetermined amount of angular displacement.

The resilient elements may be of any other non-circular or appropriately keyed shape but are preferably elliptical as shown, being flat-ended and of constant cross-section when uncompressed. This particular shape provides a progressively increasing stiffness as the arm rotates about the bolt axis. Thus, high frequency aeolian vibrations, being of lower amplitude, will impose relatively small displacements on the resilient elements and thereby encounter higher flexibilities which are consistent with optimum control. Low frequency conductor oscillations, on the other hand, are of a relatively higher amplitude and so will impose increased displacements on the resilient elements and thereby encounter greater resistance and lower flexibility, again for optimum control.

Referring now to the second embodiment of the invention illustrated in FIGS. 6, 7 and 8 corresponding components have been provided with identical reference numerals and will not be further described. In this embodiment, however, a pair of identical end caps 13 are employed and the frame 10 is provided with a recessed portion 12 which is straddled by both end caps which together hold the frame in clamping engagement between clamping surfaces 30 formed on projecting portions 31. These radially outwardly directed projections 31 on each end cap also locate in corresponding recesses 32 formed by blocks 33 and 34 projecting from both sides of the frame so as to hold the end caps against rotation about the axis of the bolt 14. As in the case of the previous embodiment, the side faces of the recess 12 limit the maximum amplitude of rotation to which the joint can be subjected, while the spacing 24 provides a limited range of differential longitudinal conductor motion.

The invention may also be embodied to accommodate conductor bundles other than four. FIGS. 9 and 10 illustrate embodiments where the frame 10 may support two or three clamping arms respectively which are preferably arranged at an angle "A" to the horizontal in the range from about 25° to about 45° in order to provide maximum damping effectiveness. It will be noted from FIG. 10 that the three conductor clamps 16 are equally spaced to define an equilateral triangle.

Although the invention has been described with reference to specific examples, it will be appreciated by those skilled in the art that the invention may be embodied in many other forms without departing from the scope of the inventive concept.

I claim:

1. A spacer damper for transmission line cables comprising:
    a substantially planar frame member formed of a rigid one-piece construction and including means defining a plurality of pivotal connection regions, each pivotal connection region having a recessed portion;
    a plurality of clamping arms, each having a distal end and a proximal end, each proximal end extending into an associated one of said frame member recessed portions and having a non-circular recess on each of two opposite surfaces thereof;
    a plurality of clamping means, each clamping means attached to the distal end of an associated one of said clamping arms for grasping an individual conductor;
    a plurality of one-piece resilient energy absorbing elements, each energy absorbing element having in its quiescent condition a substantially uniform thickness and a shape substantially conforming to the shape of the clamping arm proximal end non-circular recesses, said energy absorbing elements located in the recesses on opposite surfaces of associated ones of said clamping arm proximal ends;
    a plurality of end caps positioned over said clamping arm proximal ends and said frame member recessed portions, each end cap provided with a recess for engaging one of said energy absorbing elements;
    a plurality of locking bolts and nuts, each locking bolt connected to said frame member and extending through an associated one of said frame member recessed portions, through the associated energy absorbing elements and the proximal end of the associated clamping arm to connect such clamping arm to said frame member with that clamping arm lying substantially in the plane of said frame member, and through an associated one of said end caps and having an associated one of said nuts affixed thereon to rigidly secure said end cap to said frame member straddling the associated recessed portion to lockingly hold the associated energy absorbing elements in compression, providing resistance to turning of the associated clamping arm under torsional displacement of said clamping arm and resiliently pivotally connecting the associated clamping arm to said frame member for resilient hinged part rotation relative to said frame member while substantially preventing longitudinal displacement therebetween.

2. A spacer damper according to claim 1 wherein said resilient energy absorbing elements are elliptical in cross-section.

3. A spacer damper according to claim 2 wherein said resilient energy absorbing elements are flat-ended when uncompressed.

4. A spacer damper according to claim 1 wherein each said recessed portion of said frame member is provided with two end caps, each said end cap straddling said recessed portion and gripping said frame member therebetween by opposed clamping surfaces, said locking bolt extending through both said end caps to secure them in clamping engagement with said frame member.

5. A spacer damper according to claim 1 wherein said frame member is in the form of a closed ring and supports four clamping arms.

6. A spacer damper according to claim 1 wherein said frame member is I-shaped in section.

7. A spacer damper according to claim 1 wherein said frame member is triangular in form and supports only three clamping arms.

8. A spacer damper according to claim 1 wherein said frame member supports only two clamping arms.

9. A spacer damper according to claim 1 having each of its clamping arms arranged at an angle to the horizontal in the range of from 25° to 45° with respect to a line joining two adjacent locking bolts.

* * * * *